US012347598B2

(12) United States Patent
Hamada

(10) Patent No.: US 12,347,598 B2
(45) Date of Patent: Jul. 1, 2025

(54) REACTOR

(71) Applicant: TAMURA CORPORATION, Tokyo (JP)

(72) Inventor: Tsutomu Hamada, Saitama (JP)

(73) Assignee: TAMURA CORPORATION (JP)

( * ) Notice: Subject to any disclaimer, the term of this patent is extended or adjusted under 35 U.S.C. 154(b) by 874 days.

(21) Appl. No.: 17/533,709

(22) Filed: Nov. 23, 2021

(65) Prior Publication Data

US 2022/0319761 A1 Oct. 6, 2022

(30) Foreign Application Priority Data

Mar. 31, 2021 (JP) ................................. 2021-060037

(51) Int. Cl.
*H01F 27/28* (2006.01)
*H01F 27/24* (2006.01)

(52) U.S. Cl.
CPC ............. *H01F 27/28* (2013.01); *H01F 27/24* (2013.01)

(58) Field of Classification Search
CPC ......... H01F 27/28; H01F 27/24; H01F 27/255
See application file for complete search history.

(56) References Cited

U.S. PATENT DOCUMENTS

2005/0248426 A1* 11/2005 Lin ....................... H01F 17/045 336/83
2012/0326830 A1* 12/2012 Oshima ..................... C22C 1/05 336/221
2013/0015939 A1* 1/2013 Inagaki ................. H01F 27/255 419/13
2014/0292461 A1* 10/2014 Inoue ...................... H01F 27/28 336/212
2016/0071637 A1* 3/2016 Inagaki ............... H01F 41/0246 336/234
2020/0082185 A1 3/2020 Yamamoto et al.
2021/0407725 A1* 12/2021 Inaba ...................... H01F 27/28

FOREIGN PATENT DOCUMENTS

| | | | |
|---|---|---|---|
| EP | 2 359 963 | A1 | 8/2011 |
| JP | 2014-199874 | A | 10/2014 |
| JP | 2020/43400 | A | 3/2020 |
| WO | 2010061525 | A1 | 6/2010 |

OTHER PUBLICATIONS

Japanese Notice of Reasons for Refusal of corresponding Japanese Application No. 2021-060037, dated Jan. 7, 2025; 13 pages.

* cited by examiner

*Primary Examiner* — Malcolm Barnes
(74) *Attorney, Agent, or Firm* — Snell & Wilmer LLP

(57) ABSTRACT

A reactor that can suppress an increase in ripple current even when electric current imbalance occurs is provided. A reactor 10 includes an annular core 1 formed by a magnetic body, and two coils 2 which are attached and magnetically joined to the annular core 1 and which generate magnetic fluxes in directions opposite to each other. The differential permeability of the annular core 1 at 5000 A/m is equal to or more than 30% of the maximum differential permeability of the annular core 1.

4 Claims, 3 Drawing Sheets

REACTOR

CROSS-REFERENCE TO RELATED APPLICATION

This application is based upon and claims the benefit of priority from Japan Patent Application No. 2021-060037, filed on Mar. 31, 2021, the entire contents of which are incorporated herein by reference.

FIELD OF INVENTION

The present disclosure relates to a magnetic-coupling-type reactor.

BACKGROUND

Reactors are used in various applications such as driving systems of hybrid cars, electric cars, and fuel cell cars. The reactor is incorporated in interleaved switching circuits such as boost converter circuits. As the reactor incorporated in the boost converter circuit, magnetic-coupling-type reactors in which two coils are magnetically coupled are known.

For example, the magnetic-coupling-type reactor includes an annular core and two coils attached to the annular core. End portions of each coil are connected to a terminal of an external power supply. When the reactor is powered by the power supply, each coil generates magnetic flux according to a number of windings.

In the magnetic-coupling-type reactor, each coil generates magnetic fluxes in directions opposite to each other, and the magnetic fluxes generated by each coil cancel each other. Accordingly, in the magnetic-coupling-type reactor, since the magnetic fluxes generated by each coil cancel each other, magnetic saturation of the annular core is suppressed, and increase in ripple current is suppressed.

PRIOR ART DOCUMENT

Patent Document

Patent Document 1 JP2020-043400A

SUMMARY OF INVENTION

Problems to be Solved by Invention

In the magnetic-coupling-type reactors, current applied to two coils is set to be equivalent. However, the inventors have well-studied and found that electric current imbalance, in which magnitude of the current applied to two coils is different, occurs in the magnetic-coupling-type reactors even when the current applied to two coils is set to be equivalent.

The inventors have further studied and found that the electric current imbalance is caused by the variation of resistance values of two coils due to errors in design accuracy of the coils and the variation of resistance values of the terminal of the external power supply connected to each coil.

When the electric current imbalance occurs, the imbalance occurs in the amount of magnetic flux generated from each coil, and as a result, the imbalance occurs in the cancellation of the magnetic fluxes, and the annular core may be magnetically saturated. When the annular core is magnetically saturated, the ripple current increases. Accordingly, when the ripple current increases, loss in the reactor may increase and defects may occur in operations of the circuit in which the reactor is incorporated.

The present disclosure is provided to address the above-described problems and the objective is to provide a reactor that can suppress an increase in ripple current even when electric current imbalance occurs.

Means to Solve the Problem

A reactor of the present disclosure includes;

an annular core formed by a magnetic body; and two coils which are attached and magnetically joined to the annular core and which generate magnetic fluxes in directions opposite to each other, in which a differential permeability of the annular core at 5000 A/m is equal to or more than 30% of a maximum differential permeability of the annular core.

Effect of Invention

According to the present disclosure, a reactor that can suppress an increase in ripple current even when electric current imbalance occurs can be obtained.

EMBODIMENTS

Figure 1:
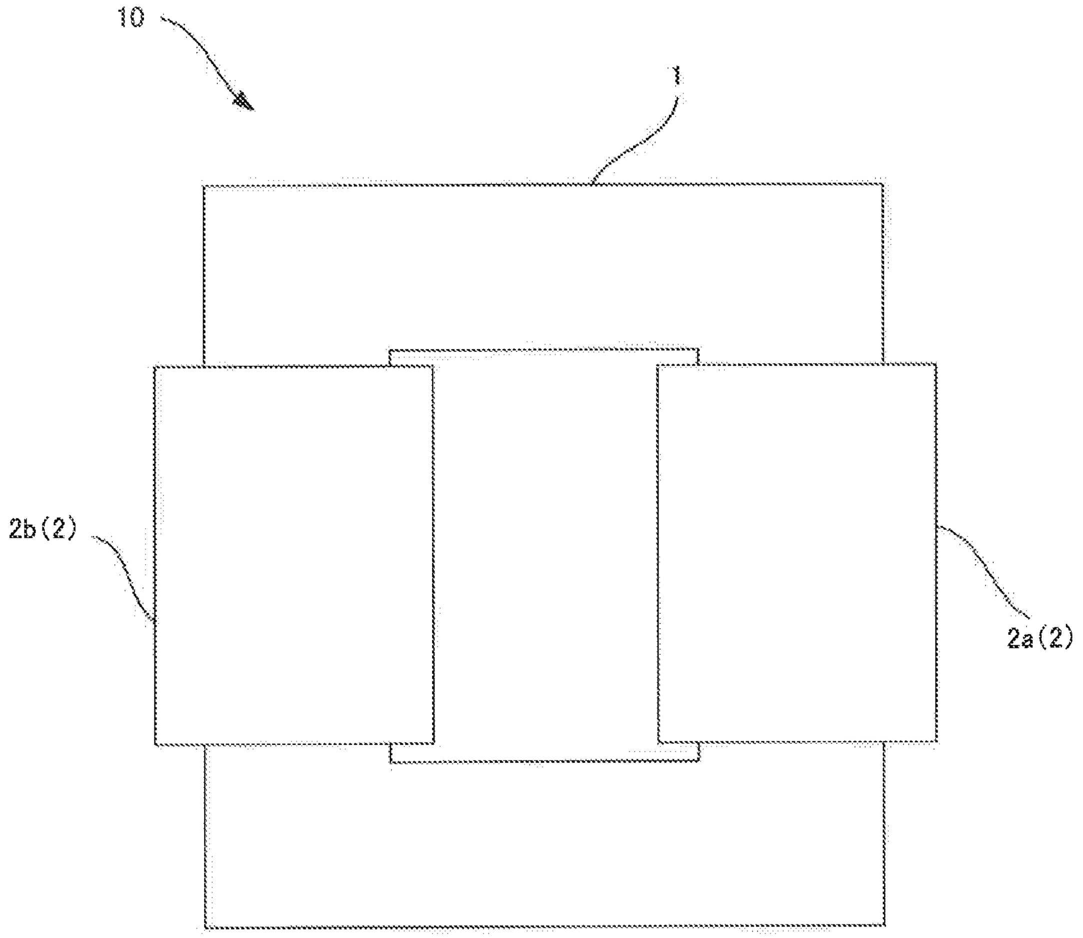
FIG. 1 is an plan view illustrating a configuration of a reactor according to an embodiment.

A reactor according to the present embodiment is described with the reference to the figures. FIG. 1 is a plan view illustrating an entire configuration of the reactor. A reactor 10 is a magnetic-coupling-type reactor in which two coils 2*a* and 2*b* are magnetically joined and the coils 2*a* and 2*b* generate magnetic fluxes in directions opposite to each other. As illustrated in FIG. 1, the reactor 10 includes an annular core 1 and a coil 2.

The annular core 1 is a magnetic body such as a magnetic powder core, a ferrite core, a silicon steel plate, a laminated steel plate, or a metal composite core. The magnetic powder core is formed by press-molding magnetic powder and annealing the press-molded magnetic powder. A main component of the magnetic powder is iron, and pure iron powder, permalloy (Fe—Ni alloy) having iron as the main component, Si-containing iron alloy (Fe—Si alloy), and sendust alloy (Fe—Si—Al alloy), amorphous alloy, nanocrystalline alloy powder, and mixture powder of two or more of the powder may be cited as the magnetic powder. A metal composite core is a core formed by kneading and molding the magnetic powder and resins.

For example, the annular core 1 is formed by a pair of core members with U-shapes. The U-shaped core member is formed by a pair of leg portions and a yoke portion which connect the pair of leg portions. Two coils 2 are provided, and the coils 2*a* and 2*b* are each attached to the pair of the leg portions.

The annular core is formed by abutting the leg portions of the pair of U-shaped core members and directly joining the leg portions using boding materials such as adhesives. In other words, only the bonding materials are intervened between the leg portions of the pair of U-shaped core members, and there are no magnetic gap materials therebetween.

A differential permeability of the annular core 1 at 5000 m/A is equal to or more than 30% of a maximum differential permeability of the annular core 1. The differential permeability refers to a slope of a tangent of a magnetization line (also referred to as a BH curve or hysteresis curve) representing a relationship between magnetic flux density B and magnetic field H. The differential permeability at which the slope of the tangent of the magnetization line becomes maximum is the maximum differential permeability. By setting the differential permeability to be equal to or more than 30% of a maximum differential permeability, the magnetic saturation of the annular core 1 and an increase in a ripple current can be suppressed even in the electric current imbalance state in which magnitude of the current applied to the coils 2*a* and 2*b* is different. Furthermore, it is preferable that the differential permeability of the annular core 1 at 5000 m/A is equal to or more than 39% of a maximum differential permeability. By setting the differential permeability to be equal to or more than 39% of a maximum differential permeability, the increase in the ripple current in the electric current imbalance state can be more suppressed. It is further preferable that the differential permeability of the annular core 1 at 5000 m/A is equal to or more than 51% of a maximum differential permeability. By setting the differential permeability to be equal to or more than 51% of a maximum differential permeability, the increase in the ripple current in the electric current imbalance state can be further suppressed.

Furthermore, it is preferable that the maximum differential permeability is equal to or more than 50 and equal to or less than 200. When the maximum differential permeability is less than 50, it is difficult to obtain the suppression effect for the increase in the ripple current. On the other hand, as the maximum differential permeability increases, the ripple current decreases, however, when the maximum differential permeability exceeds 200, the decrease rate of the ripple current drastically decreases, and it is difficult to obtain the reduction effect for the increase in the ripple current.

The maximum differential permeability of the annular core 1 can be adjusted by changing the particle size of the magnetic powder forming the annular core 1 and the density of the annular core 1. For example, by increasing the particle size of the magnetic powder, the maximum differential permeability of the annular core 1 can be increased. Furthermore, when press-molding the magnetic powder core, etc., by increasing the pressure for pressing to increase the density of the annular core 1, the maximum differential permeability can be increased.

The differential permeability at 5000 A/m relative to the maximum differential permeability can be adjusted by adjusting the addition amount of an insulation material forming an insulation layer coated on a surface of the magnetic powder. By increasing the addition amount of the insulation material, distance between the magnetic powder expands and micro-gaps are formed such that the differential permeability at 5000 A/m can suppress the magnetic saturation (depression), meanwhile, the maximum differential permeability tends to decrease. Therefore, when the maximum differential permeability is μa and the differential permeability at 5000 A/m is μB, μB/μa becomes large. Accordingly, by adjusting the amount of the insulation material, the differential permeability at 5000 A/m can be equal to or more than 30% of a maximum differential permeability. As the insulation material, silane coupling agents, silicone oligomers, silicone resins, etc., may be cited.

As the silane coupling agents, aminosilane-based silane coupling agents, epoxysilane-based silane coupling agents, and isocyanurate-based silane coupling agents may be used, and in particular, 3-aminopropyltriethoxysilane, 3-glycidoxypropyltrimethoxysilane, and tris-(3-trimethoxysilylpropyl) isocyanurate are preferable.

As the silicone oligomers, methyl-based oligomers and methylphenyl-based oligomers which have alkoxysilyl group but no reactive functional group, epoxy-based oligomers, epoxymethyl-based oligomers, mercapto-based oligomers, mercaptomethyl-based oligomers, acrylic methyl-based oligomers, methacrylic methyl-based oligomers, and vinylphenyl-based oligomers, which have alkoxysilyl group and reactive functional group, or alicyclic epoxy-based oligomers which has no alkoxysilyl group and has reactive functional group, etc., can be used. In particular, a thick and hard insulating layer can be formed by using methyl-based or methylphenyl-based silicone oligomers. Furthermore, in consideration of the ease to form the insulating layer, methyl-based or methylphenyl-based oligomers with relatively low viscosity may be used.

The silicone resin is a resin that has siloxane bonding (Si—O—Si) as a main skeleton. Highly flexible films can be formed by using the silicone resin. The silicone resin may be methyl-based resin, methylphenyl-based resin, propylphenyl-based resin, modified epoxy-based resin, modified alkyd-based resin, modified polyester-based resin, rubber-based resin, etc. In particular, when methylphenyl-based silicone resin is used, the insulating layer with low heating weight loss and excellent heat resistance can be obtained.

The coils 2*a* and 2*b* are formed by one flat rectangular conductive member coated with an insulation coating such as enamel. The coils 2*a* and 2*b* are formed by spirally winding the conductive member while displacing the winding position for each one turn along the winding axis. The winding scheme may be a spiral flat-wise winding in which the conductive member is wound so that a wide surface of the conductive member expands along the winding axis of the coil 2, or a spiral edgewise winding in which the wide surface of the conductive member expands in the direction orthogonal to the winding axis of the coils 2*a* and 2*b*. Note that the conductive member forming the coils 2*a* and 2*b* may not be in flat rectangular shape, and may be round wires or any other wires.

An end portion of the conductive members forming the coils 2*a* and 2*b* is electrically connected to the terminal of the external power supply. When power is supplied from the external power supply and the coils 2*a* and 2*b* are conducted, each of the coils 2*a* and 2*b* generates magnetic fluxes in directions opposite to each other. That is, the magnetic fluxes generated by each of the coils 2*a* and 2*b* flows in the annular core that is the magnetic path in the directions cancelling each other.

Furthermore, to insulate the annular core 1 and the coil 2, the reactor 10 includes a resin member (not shown). For example, as the materials of the resin member, epoxy resins, unsaturated polyester resins, urethane resins, BMC (Bulk Molding Compound), PPS (Polyphenylene Sulfide), and PBT (Polybutylene Terephthalate), etc., may be cited.

In below, the present disclosure is further described in detail based on the examples. Note that the present disclosure is not the following examples.

Firstly, a magnetic powder core of the example 1 was produced. Pure iron powder was prepared as the magnetic powder. 1.0 wt % of a silicone binder was added to the pure iron powder and was dried in the atmosphere at 180° C. for 2 hours. The pure iron powder to which 0.2 wt % of lubricant had been added was filled in a molding and was press-molded to obtain a pair of U-shaped powder compact body. The pressure for the press-molding was 1000 Mpa. Lastly, heat-processing was performed to the powder compact body in the nitrogen atmosphere at 625° C. for 30 minutes to obtain the magnetic powder core of the example 1.

A flat rectangular wire with thickness of 1.0 mm and width of 5.0 mm was prepared as the conductive member forming the coils 2*a* and 2*b*. The flat rectangular wire was wound for 30 turns for each of the coils 2*a* and 2*b* to produce the reactor illustrated in FIG. 1. At this time, the flow of the magnetic fluxes generated by the coils 2*a* and 2*b* was set to be opposite to each other. Then, values of the ripple current when the current was equivalent and the current was imbalanced were simulated and analyzed. When the current was equivalent, the current applied to the coils 2*a* and 2*b* was 100 A and equivalent. On the other hand, when the current was imbalanced, the current applied to the coil 2*a* was 150 A and the current applied to the coil 2*b* was 100 A. Note that the condition in which input voltage of the coil was 150 V, output voltage of the coil was 700 V, and operation frequency was 20 kHz was the same when the current was equivalent and the current was imbalanced.

For the examples 2 to 5 and the comparative examples 1 to 3, the maximum differential permeability and the differential permeability at 5000 A/m of the magnetic powder core of the example 1 were changed by simulation. In detail, the binder, the differential permeability at 5000 A/m was changed to the values indicated in Tables 1 and 2.

Similarly to the example 1, the reactors as illustrated in FIG. 1 were produced in simulation by winding the coil around the magnetic powder core of the examples 2 to 5 and the comparative examples 1 to 3. Then, the values of the ripple current were analyzed when the current was equivalent and the current was imbalanced. Note that in the examples 2 to 5 and the comparative examples 1 to 3, the values of the ripple current when the current was equivalent were performed only for the examples 2 and 3 and the comparative examples 1 and 3.

Figure 2:
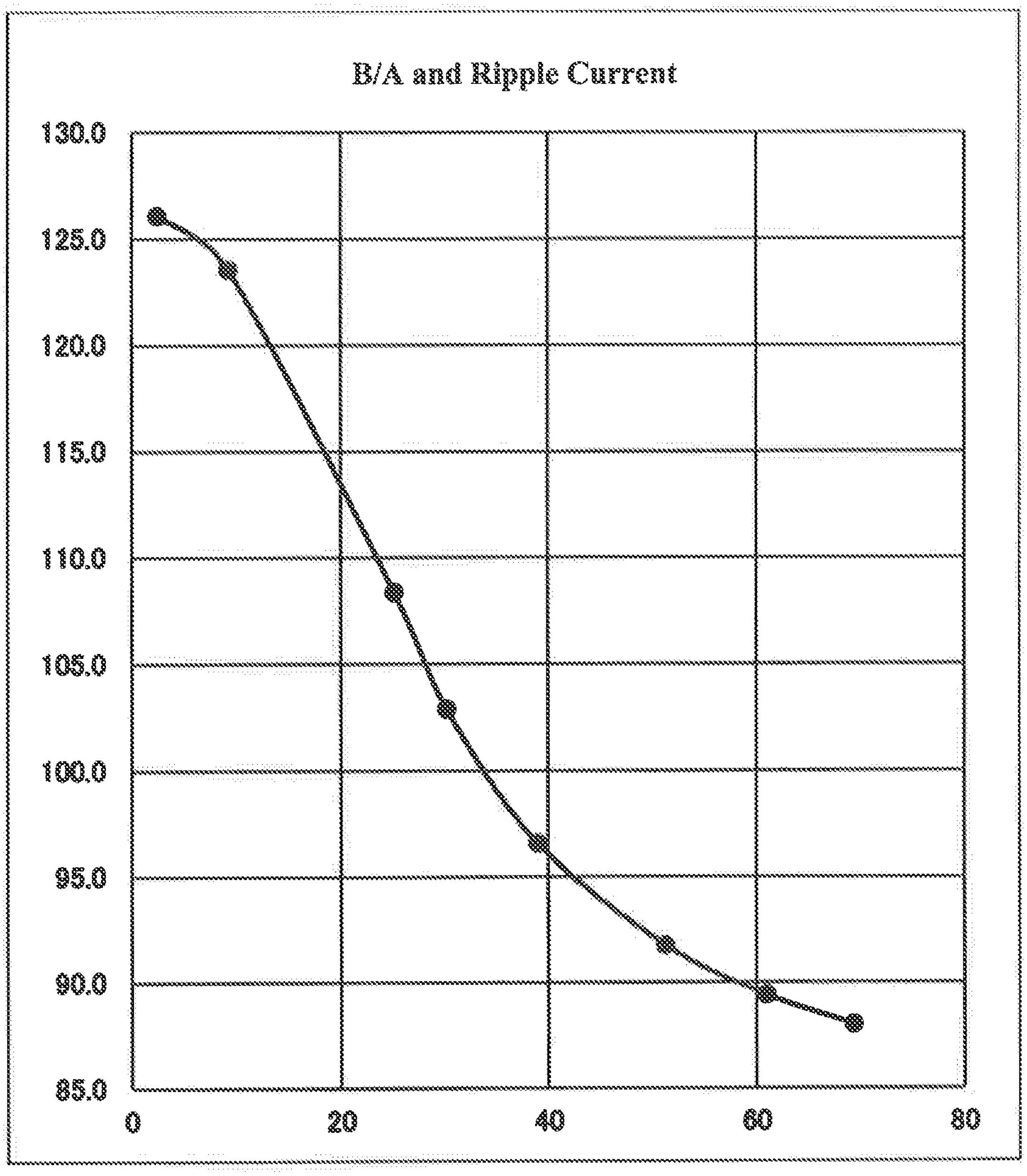
FIG. 2 is a graph indicating a relationship between a ratio of a differential permeability at 5000 A/m relative to a maximum permeability, and a synthetic ripple current.

The results of when the current was equivalent is indicated in table 1. Furthermore, the results of when the current was imbalanced is indicated in Table 2 and FIG. 2. FIG. 2 is a graph indicating a relationship between a ratio of a differential permeability at 5000 A/m relative to a maximum permeability, and a synthetic ripple current. Note that the ripple current of I-1 in Tables 1 and 2 is a value obtained by subtracting the minimum value of the current simulation waveform flowing in the coil 2*a* from the maximum value thereof. The ripple current of I-2 in Tables 1 and 2 is a value obtained by subtracting the minimum value of the current simulation waveform flowing in the coil 2*b* from the maximum value thereof. The synthetic ripple current is a value obtained by subtracting the minimum value of the current simulation waveform, to which the ripple current of I-1 and I-2 was synthesized, from the maximum value thereof. In addition, B/A is a ratio of a differential permeability at 5000 A/n relative to a maximum permeability.

TABLE 1

| | Current Equivalent | | | | |
|---|---|---|---|---|---|
| | Example 1 | Example 2 | Example 3 | Comparative Example 1 | Comparative Example 3 |
| Maximum Differential Permeability (A) | 114 | 137 | 171 | 342 | 1254 |
| Differential Permeability (B) at 5000 A/m | 79 | 83 | 88 | 86 | 31 |
| B/A | 69% | 61% | 51% | 25% | 2% |
| Ripple Current of I-1 | 43.7 | 42.2 | 40.8 | 38.4 | 38.3 |
| Ripple Current of I-2 | 43.6 | 42.2 | 40.7 | 38.3 | 38.2 |
| Synthetic Ripple Current | 68.1 | 67.3 | 66.7 | 66.1 | 69.1 |
| (I-2) − (I-1) | −0.1 | 0 | −0.1 | −0.1 | −0.1 |

TABLE 2

| | Current Imbalanced | | | | | | | |
|---|---|---|---|---|---|---|---|---|
| | Example 3 | Example 2 | Example 3 | Example 4 | Example 5 | Comparative Example 1 | Comparative Example 2 | Comparative Example 3 |
| Maximum Differential Permeability (A) | 114 | 137 | 171 | 228 | 291 | 342 | 684 | 1254 |
| Differential Permeability (B) at 5000 A/m | 79 | 83 | 88 | 89 | 88 | 86 | 63 | 31 |
| B/A | 69% | 61% | 51% | 39% | 30% | 25% | 9% | 2% |
| Ripple Current of I-1 | 41.7 | 40.4 | 39.0 | 37.4 | 36.3 | 35.8 | 33.8 | 32.9 |
| Ripple Current of I-2 | 65.7 | 66.6 | 68.5 | 72.9 | 78.9 | 84.1 | 99.0 | 102.0 |
| Synthetic Ripple Current | 88.0 | 89.4 | 91.8 | 96.6 | 102.9 | 108.4 | 123.6 | 126.1 |
| (I-2) − (I-1) | 24.0 | 26.2 | 29.5 | 35.5 | 42.5 | 48.3 | 65.2 | 69.0 |

density of the magnetic powder core was changed by changing the particle size of the pure iron powder and the pressure during the press-molding to change the maximum differential permeability to be values indicated in Tables 1 and 2. Also, by changing the addition amount of the silicone As indicated in Table 1, the ripple current when the current was equivalent was the same as the ripple current of I-1 and I-2 in the examples 1 to 3 and the comparative examples 1 and 3. It was observed that the synthetic ripple current in all cases were equal to or more than 70.

In contrast, when comparing when the current was equivalent and when the current was imbalanced, the value of the ripple current of I-2 when the current was imbalanced had been increased from the value when the current was equivalent, and it was observed that the values of the ripple current of I-1 and I-2 were different. As a result, when the current was imbalanced, it was observed that the synthetic ripple current had been increased from the value when the current was equivalent. It is assumed the magnetic fluxes generated from each coils varied because the difference occurred in the ripple current of I-1 and I-2, causing the imbalance in the cancellation of the magnetic fluxes, which resulted in the magnetic saturation of the annular core.

In particular, when comparing Tables 1 and 2, in the comparative example 1 or 3 in which the value of the differential permeability at 5000 A/m was less than 30% of the maximum differential permeability, the ripple current of I-2 when the current was imbalanced increase 40 or more than when the current was equivalent, and the difference between the ripple current I-1 and I-2 was equal to or more than 48. Furthermore, in the comparative example 3 when the current was imbalanced, the difference between the ripple current I-1 and I-2 was as much as equal to or more than 70, and the synthetic ripple current exceeds 126, meaning that the synthetic ripple current when the current was imbalanced had increased twice as much as the synthetic ripple current when the current was equivalent.

Meanwhile, as shown in Table 2 and FIG. 2, it was observed that an increase in the ripple current of I-2 can be suppressed as the value of the differential permeability at 5000 A/m relative to the maximum differential permeability becomes larger. In the example 5 in which the value of the differential permeability at 5000 A/m was 30% of the maximum differential permeability, it was observed that the ripple current of I-2 became smaller than 80, the difference between the ripple current I-1 and I-2 became as small as 42.5, and the synthetic ripple current became approximately 100.

In addition, in the example 4 in which the value of the differential permeability at 5000 A/m was 39% of the maximum differential permeability, it was observed that the difference between the ripple current I-1 and I-2 became 35.5 that is less than 40 and the synthetic ripple current was less than 100, meaning that the increase in the synthetic ripple current was further effectively suppressed. Moreover, in the examples 1 to 3 in which the value of the differential permeability at 5000 A/m exceeded 51% of the maximum differential permeability, it was observed that the difference between the ripple current I-1 and I-2 was less than 30, and the synthetic ripple current was approximately equal to or less than 90. Therefore, it was confirmed that the value of the differential permeability at 5000 A/m relative to maximum differential permeability was preferably equal to or more than 30, more preferably equal to or more than 39, and further preferably equal to or more than 51.

Figure 3:
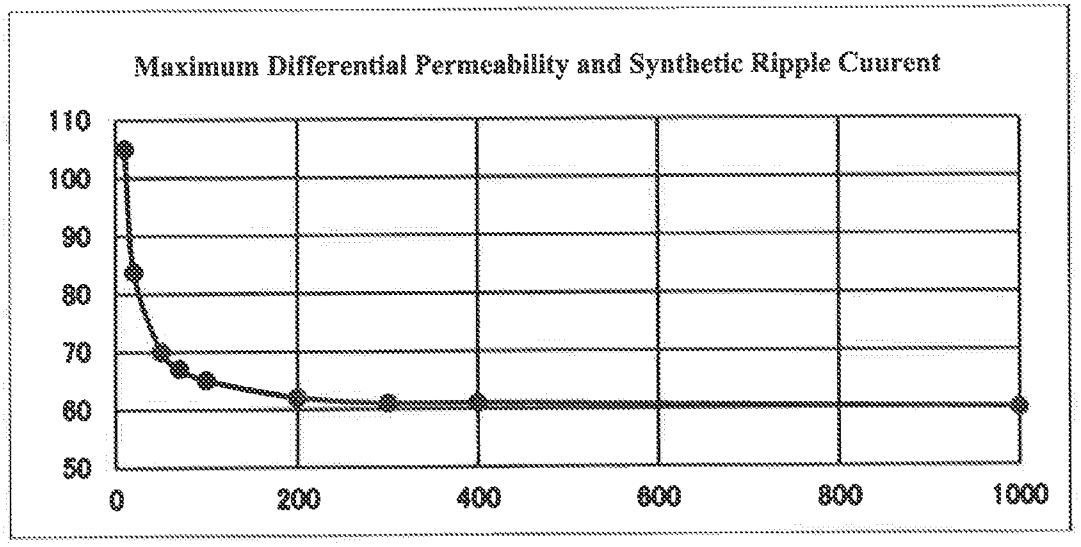
FIG. 3 is a graph indicating a relationship between the maximum differential permeability and the ripple current.

Next, a relationship between the maximum differential permeability and the ripple current was simulated and analyzed. Firstly, the magnetic powder core with the maximum differential permeability as indicated in Table 3 was produced. Then, similarly to the example 1, the coils 2*a* and 2*b* which had been wound for 30 turns were attached to the magnetic powder core to produce the reactor illustrated in FIG. 1. Then, the relationship between the maximum differential permeability, the ripple current at one side, and the synthetic ripple current was simulated and analyzed. The analysis was only performed for when the current was equivalent. The analysis condition was the same as the example 1 when the current was equivalent. The analysis result is shown in Table 3 and FIG. 3. FIG. 3 is a graph indicating the relationship between the maximum differential permeability and the synthetic ripple current. Note that the ripple current at one side indicated in Table 3 is a value obtained by subtracting the minimum value of the current simulation waveform flossing in the coil 2*a* from the maximum value thereof.

TABLE 3

| | Maximum Differential Permeability | | | | | | | | |
|---|---|---|---|---|---|---|---|---|---|
| | 10 | 20 | 50 | 70 | 100 | 200 | 300 | 400 | 1000 |
| Ripple Current at one side | 108 | 74 | 49 | 44 | 40 | 35 | 33 | 32 | 31 |
| Synthetic Ripple Current | 105 | 84 | 70 | 67 | 65 | 62 | 61 | 61 | 60 |

As shown in Table 3 and FIG. 3, when the maximum differential permeability was as low as 10 to 20, it was observed that the ripple current significantly increased. Accordingly, the ripple current at one side and the synthetic ripple current tended to decrease as the maximum differential permeability increased, and it was confirmed that the maximum differential permeability of 50 was the turning point. In detail, when the maximum differential permeability exceeded 50, the ripple current at one side became less than 50, the synthetic ripple current became equal to or less than 70, and the increase in the ripple current was suppressed.

However, when the maximum differential permeability exceeded 200, the suppressing level of the ripple current decreased, and there was no large difference between the maximum differential permeability of 200, and the ripple current of the maximum differential permeability of 1000 that is five time larger. Therefore, by setting the maximum differential permeability to be equal to or more than 50 and equal to or less than 200, it was observed that the ripple current could be effectively suppressed. By this, by setting the maximum differential permeability to be equal to or more than 50 and equal to or less than 200, it was observed that the ripple current when the current was equivalent could be suppressed.

As described above, the reactor 10 of the present embodiment includes the annular core 1 formed by a magnetic body, and two coils 2 which are attached and magnetically joined to the annular core 1 and which generate magnetic fluxes in directions opposite to each other. The differential permeability of the annular core 1 at 5000 A/m is equal to or more than 30% of the maximum differential permeability of the annular core 1.

By this, the increase in the ripple current when the current is imbalanced can be suppressed. Therefore, the action of the reactor 10 is stabilized and the quality of the reactor 10 increases.

The maximum differential permeability of the annular core 1 is equal to or more than 50 and equal to or less than 200. By this, the increase in the ripple current when the current was equivalent can be effectively suppressed.

The annular core 1 is formed in an annular shape by joining the pair of U-shaped core members, and the core members are directly joined by bonding materials. In other words, and there are no magnetic gap materials between the core members.

When using the magnetic gap materials, the cost increases because the number of members increases, and the workability becomes worse because a work to join the core members and the magnetic gap materials is required. Furthermore, if the magnetic gap materials are used, the leakage flux would be produced from the magnetic gap materials, and the eddy current loss may increase.

However, as the present embodiment, by directly joining the core members, the cost can be reduced and the workability can be improved. Furthermore, since the magnetic gap materials are not provided, the increase in the leakage flux can be prevented, and the increase in the eddy current loss can be prevented. In addition, the reactor 10 can be downsized because the magnetic gap materials are not used.

Although embodiments according to the present disclosure are described herein, the embodiments are only provided as examples and are not intended to limit the scope of claims. Above-described embodiments can be implemented in other various forms, and various omissions, replacements, and modifications can be made without departing from the scope of claims. The embodiments and modifications thereof are within the scope and abstract of the invention, and are included in the scope of claims and equivalent ranged thereto.

REFERENCE SIGNS

10: reactor
1: annular core
2, **2*a*, 2*b***: coil

The invention claimed is:

1. A reactor comprising:

an annular core formed by a magnetic body; and two coils which are attached and magnetically joined to the annular core and which generate magnetic fluxes in directions opposite to each other, wherein a differential permeability of the annular core at 5000 A/m is equal to or more than 30% of a maximum differential permeability of the annular core.

2. The reactor according to claim 1, wherein the maximum differential permeability of the annular core is equal to or more than 50 and equal to or less than 200.

3. The reactor according to claim 1, wherein:

the annular core forms an annular shape by joining a plurality of core members, and the core members are directly joined by bonding materials.

4. The reactor according to claim 2, wherein:

the annular core forms an annular shape by joining a plurality of core members, and the core members are directly joined by bonding materials.

* * * * *